United States Patent Office 2,723,210
Patented Nov. 8, 1955

2,723,210

METHOD OF TREATING GLASS FIBERS WITH AN AMMONIUM HYDROXIDE SOLUTION CONTAINING A SILANE UNSATURATED

Lawrence P. Biefeld, Granville, Ohio, assignor to Owens-Corning Fiberglas Corporation, a corporation of Delaware No Drawing. Application October 2, 1952,
Serial No. 312,872

5 Claims. (Cl. 117—126)

This invention relates to the treatment of glass fibers for the purpose of improving their performance characteristics when used in combination with resinous materials in the manufacture of plastics and laminates.

It is an object of this invention to provide a composition for use in the treatment of glass fibers whereby greater utilization can be made of the tremendous strength properties of the glass fibers in the reinforcement of plastics and it is a related object to provide a method for treating glass fibers to accomplish same.

It is well known that glass fibers inherently possess tremendous strength but that full utilization of those strength properties cannot be achieved when the bonding relation between the high modulus, high strength glass fibers with the low strength, low modulus plastic matrix is so insufficient as to impair the distribution of stresses from fiber to fiber whereby such stresses might be uniformly distributed over the plastic to resist failure.

Because the fibers are characterized by perfectly smooth surfaces, physical anchorage of the resinous material is difficult to achieve and because of the hydrophilic nature of the groupings which predominate on the glass fiber surfaces, anchorage through chemical forces is weak and substantially completely eliminated under high humidity conditions by a moisture film which preferentially forms on the glass fiber surfaces and displaces the resinous material.

It has thus become necessary to make use of anchoring agents having a portion which bonds or reacts with the groupings that exist on the glass fiber surfaces and other portions which bond or react with the resinous material so as to tie in the resinous material with the glass fibers in a manner which resists weakening of the bonding relation in the presence of moisture or other elements normally existing in the atmosphere or in the environment to which the reinforced plastic might be exposed, such for example as in weak acids or weak bases.

In my copending application Ser. No. 221,512, filed April 17, 1951, now U. S. Patent Serial No. 2,683,097, description is made of the use of a coupling agent in the form of a water soluble salt of an unsaturated organo-silicon polymer, generally referred to as a polysiloxano-late in which one or more of the organic groups attached directly to the silicon atom contains less than 8 carbon atoms and has an unsaturated carbon to carbon linkage capable of addition polymerization. Such material when applied to the glass fiber surfaces from aqueous solution becomes insolubilized upon drying and attaches to the glass fibers through the silicon oxide linkages while it is believed that the unsaturated organic group is capable of coordinating or reacting with groups embodied in the resinous binder, such for example as polymerizing with the unsaturated carbon to carbon linkage existing in unsaturated polyester resins generally used in combination with glass fibers for the manufacture of plastics and laminates.

In accordance with the practice of this invention, the performance characteristics of the glass fibers are improved by the treatment of the glass fibers in forming, or subsequent to forming after applied protective agents have been removed, with an aqueous composition formulated to contain a silane having from 1–3 hydrolyzable groups and an organic group attached directly to the silicon atom containing an unsaturated carbon to carbon linkage in an aliphatic chain containing less than 8 carbon atoms. The silane is incorporated in the aqueous medium in combination with a base for maintaining the stability of the solution and for catalyzing the hydrolyzation and polymerization of the silane whereby a polymer is deposited in an insolubilized state on the glass fiber surfaces upon drying.

As the base, it is preferred to make use of ammonia or other weak basic salt in amounts to adjust the pH of the aqueous system to between 4–10. For purposes of stability, it is preferred to adjust the pH of the composition to the acid side between 4–7, but for better orientation and performance it is preferred to adjust the pH to the alkaline side between 7–10. Ammonia or other weak basic salt such as sodium acetate, sodium formate and the like apparently provides for greater stability of the silane in the aqueous treating composition and it causes polymerization to take place in a manner to form lower molecular weight polymers capable of imparting some improvement in the handling characteristics of the fibers as well as the desired coupling to improve their performance characteristics. Stronger bases, such as sodium hydroxide or other alkali metal hydroxide, may be used but to less advantage than ammonia. The alkali metal hydroxides react with the hydrolyzable groups to form the corresponding salts which after the coating is heated on the glass fiber surfaces to set the polysiloxane, must be washed with an acid to form a salt which must then be removed as by a water rinse from the glass fiber surfaces. The formed salts tend to inhibit the orientation of the polar groups of the silane toward the glass fiber surfaces and compete with the silane reaction. Although the alkali metal hydroxide catalyzes the reaction to produce polymers of larger molecular weight it also acts as an end blocker of hydroxy groups for polymerization. On the other hand, with ammonia, various polysiloxanols of lower molecular weight are formed into a stable colloidal dispersion in the aqueous medium. When using an ammonia system, it becomes unnecessary to make use of an acid wash followed by a water rinse, as in the alkali metal base system, because the ammonia group can be removed by volatilization at elevated temperature.

Silanes which may be used in accordance with the concepts of this invention may be represented by the formulae:

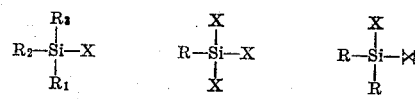

wherein X is a halogen of the type chlorine or bromine or an oxy group of low molecular weight capable of ready hydrolyzation from the organo-silicon molecule such as methoxy, ethoxy and the like oxy groups. R may be represented by hydrogen or alkyl groups of the type ethyl, methyl, propyl, butyl, isobutyl and the like, aryl or alkaryl groups of the type benzyl, phenyl, toluyl, naphthyl and the like. At least one of the R groups should be an organic group containing less than 8 carbon atoms in straight chain arrangement and having an unsaturated carbon to carbon linkage through which addition polymerization may take place, such for example as allyl, vinyl, methallyl, styryl and the like. Silanes of the type described include vinyltrichloro silane, methallyldichloro silane, diallyldiethoxy silane, methallyltriethoxy silane, styrytrichloro silane, vinyldichloro silane.

In a treating composition for improving the performance characteristics of glass fibers, the amount of silane may range from 0.1 to 2.0 percent by weight and it is preferred to limit the concentration to between 0.25 to 1.0 percent by weight.

It has been found that instability results in the treating composition and an inferior treated glass fiber is secured when the formulation of the silane in aqueous medium adjusted to the desired pH range of 4–10 with ammonia is made at elevated temperatures. When formulated at a temperature below 75° F. and preferably at a temperature considerably below 75° F., a composition is formed which is stable under conditions of storage and application to treat the glass fibers.

It has been found further that for proper reaction or bonding of the anchoring agent to the glass fibers, the surfaces of the fibers should be free for such coupling reaction. It is preferred to apply the treating composition onto the glass fiber surfaces in forming because, at that time, the fibers are stronger and surfaces more reactive. Therefore, a more desirable bonding relation can be immediately established. If a size has been applied to the glass fibers in forming to provide improved handling characteristics for the steps of winding, twisting, plying and weaving to condition the fibers into a form for combination with the resinous material, then such size should be removed either by a washing solution or by burning off or the like before the treating composition is applied to deposit the anchoring agent on the glass fiber surfaces.

When applied to the glass fiber surfaces and dried, an organo-silicon polymer is deposited which becomes insolubilized as a substantially continuous coating on the glass fibers. It is believed that a bond is established between the polymer and the glass fiber surfaces either by coordination between the silicon oxide linkages and the silicon oxide groups in the glass or by reaction of the hydrolyzable groups or through the hydroxy groups that are formed upon hydrolyzation and negative groups that predominate on the glass fiber surfaces thereby to tie in the coupler with the glass fibers. The unsaturated organic group in the organo-silicon seemingly functions either by addition polymerization with unsaturated groups in the resinous material or monomer of which it is formed or by coordination of highly functional groups of such resinous material or monomer to integrate the resinous material with the coupling agent which thereby ties in the resinous material with the glass fiber surfaces. The unsaturated polyesters often used with glass fibers in the manufacture of plastics and laminates are representative of the first type of material and other resinous materials which enjoy improved adhesion with the glass fibers treated with the anchoring agent include polystyrenes, polyalkyl acrylates, polyvinyl derivatives, polyamides, polyethylenes and the like.

The following formulation of a treating composition embodying features of this invention is given by way of illustration, but not by way of limitation:

*Example 1*

1.0 percent by weight diallyldiethoxy silane, the remainder being water with sufficient ammonium hydroxide to adjust the pH of the solution to between 7 and 10.

The ammonium hydroxide is incorporated with the water to form a basic solution and cooled to a temperature of about 35–55° F. prior to the incorporation of the silane. A stable solution is formed which can be stored for an indefinite period of time and applied to the glass fibers in forming through a wiper pad as the hundreds of filaments of glass fibers are drawn from molten streams of glass issuing from the bushing on the underside of a glass melting furnace. The treating composition is applied to the filaments as they are brought together to form strands and is dried in strand form while wound onto a forming roll.

*Example 2*

0.3 percent by weight methallyldichloro silane sodium acetate and ammonium hydroxide in amounts to adjust the pH of the solution to 4, the remainder being water.

The sodium acetate and ammonia are added to the water and while the solution is cooled to a temperature of about 50–55° F., the organo-silicon is incorporated to form a treating composition which may be used for improving the performance characteristics of glass fibers in use with a polyester resin combined with the glass fibers in the manufacture of a laminate.

If the glass fibers in forming the laminate are in the form of a woven fabric treated with a size to enhance the twisting, plying and weaving of the fibers in forming the fabric, the size is removed as by a heat treatment and then the treating composition of Example 2 may be applied by a dip process followed either by air drying or by drying at a slightly elevated temperature up to about 250° F.

It will be apparent from the foregoing description that there has been provided a composition and means for treating glass fibers in a manner to increase the bonding relation between the resinous material and the glass fibers whereby the high strength glass fibers can be so strongly bonded with the low strength plastic matrix as to permit the distribution of stresses between the fibers thereby to make greater utilization of the high strength of the fibers in resisting rupture or failure of the plastic product.

*Example 3*

1 mol vinyltrichlorosilane
4 mols alkali metal base

The above ingredients are introduced in water to provide for a concentration of 0.5 percent by weight of the silane. It is believed that three mols of the alkali metal base react with the three available hydrolyzable groups while one mol remains to form the salt.

It will be understood that the use of a treating composition in the manner described for improving the performance characteristics of glass fibers may be adapted to increase the bonding relation between various resinous materials containing highly functional groups capable of reaction or coordination with the unsaturated group in the organo silane and that various other combinations of the organo-silicons with other materials in the treating composition may be made for application to the glass fiber surfaces to enhance the use thereof, without departing from the spirit of the invention, epecially as defined in the following claims.

I claim:

1. The method of treating glass fibers to improve the adhesion of resinous materials formed by addition polymerization through unsaturated groups comprising coating bare glass fibers with an ammonium hydroxide solution having a pH between 4–10 and containing a small amount of a silane having from 1–3 hydrolyzable groups and an organic group having from 2–8 carbon atoms in an aliphatic group which also contains an unsaturated carbon to carbon linkage.

2. The method of treating glass fibers to improve the adhesion of resinous materials formed by addition polymerization through unsaturated groups comprising coating the bare glass fibers with an ammonium hydroxide solution having a pH between 4–7 and containing a small amount of a silane having from 1–3 hydrolyzable groups and an organic group having from 2–8 carbon atoms in an aliphatic group which also contains an unsaturated carbon to carbon linkage.

3. The method of treating glass fibers to improve the adhesion of resinous materials formed by addition polymerization through unsaturated groups comprising coating the bare glass fibers with an ammonium hydroxide solution having a pH between 7–10 and containing a small amount of a silane having from 1–3 hydrolyzable groups and an organic group having from 2–8 carbon atoms in an aliphatic group which also contains an unsaturated carbon to carbon linkage whereby better orientation and adhesion of the polysiloxane is secured on the glass fiber surfaces.

4. The method of treating glass fibers to improve the adhesion of resinous materials formed by polymerization through unsaturated groups comprising coating the bare glass fibers with an ammonium hydroxide solution having a pH between 4–10 and containing from 0.1 to 2.0 percent by weight of a silane having from 1–3 hydrolyzable groups and an organic group having from 2–8 carbon atoms in an aliphatic group which also contains an unsaturated carbon to carbon linkage capable of addition polymerization.

5. In the method of treating glass fibers to improve the adhesion of resinous materials comprising the steps of forming a treating composition by introducing a silane having from 1–3 hydrolyzable groups and an organic group having from 2–8 carbon atoms in an aliphatic group which also contains an unsaturated carbon to carbon linkage and in amounts ranging from 0.1 to 2.0 percent by weight into water, maintaining the temperature of the water during the addition to below 75° F., adjusting the mixture to a pH between 4–10 with ammonium hydroxide to form a stable solution of the silane, its hydrolysis product and its polymerization product, coating the bare glass fiber surfaces with the treating composition and then drying the coating whereby all polysiloxane is insolubilized from the treating composition on the glass fiber surfaces.

References Cited in the file of this patent

UNITED STATES PATENTS

| | | |
|---|---|---|
| 2,390,370 | Hyde | Dec. 4, 1945 |
| 2,476,307 | Klein et al. | July 19, 1949 |
| 2,563,288 | Steinman | Aug. 7, 1951 |
| 2,568,384 | Cheronis | Sept. 18, 1951 |
| 2,570,551 | Hatcher et al. | Oct. 9, 1951 |
| 2,595,728 | Swiss et al. | May 6, 1952 |
| 2,604,688 | Slayter | July 29, 1952 |